United States Patent [19]
McKenzie et al.

[11] Patent Number: 5,337,907
[45] Date of Patent: Aug. 16, 1994

[54] HOLDER FOR BEVERAGE CONTAINERS AND RELATED ARTICLES

[75] Inventors: Charles R. McKenzie; Harry C. Ingle, both of Stockbridge, Ga.

[73] Assignee: Sport Supply Group Inc., Farmers Branch, Tex.

[21] Appl. No.: 163,598

[22] Filed: Dec. 7, 1993

Related U.S. Application Data

[63] Continuation of Ser. No. 893,726, Jun. 5, 1992, abandoned.

[51] Int. Cl.⁵ ............................................. A47F 5/08
[52] U.S. Cl. .......................................... 211/88; 211/75; 206/427; 224/148; 224/268; 383/23; 383/39
[58] Field of Search ................. 383/13, 16, 22, 39; 224/148, 42.46 R, 268; 206/162, 427; 211/75, 88, 71, 60.1

[56] References Cited

U.S. PATENT DOCUMENTS

| | | | |
|---|---|---|---|
| 1,009,518 | 6/1914 | Smith | 224/268 X |
| 1,600,027 | 9/1926 | Welsand | 224/224 X |
| 3,163,338 | 12/1964 | Gottsegen | 224/42.46 R X |
| 3,967,666 | 7/1976 | Farrar | 383/9 X |
| 4,327,836 | 5/1982 | Okuno . | |
| 4,372,468 | 2/1983 | Harvey | 224/268 X |
| 4,376,502 | 3/1983 | Cohen | 224/42.46 R X |
| 4,449,654 | 5/1984 | Cappis | 224/148 |
| 4,676,419 | 6/1987 | Victor | 224/269 X |
| 4,793,532 | 12/1988 | Cash | 224/202 |
| 4,867,360 | 9/1989 | Howard | 224/148 X |
| 4,953,765 | 9/1990 | Little et al. | 383/39 X |
| 4,957,231 | 9/1990 | Kalisher | 224/268 X |
| 5,004,136 | 4/1991 | Leath | 224/268 |
| 5,040,711 | 8/1991 | Niederhauser et al. | 224/42.46 R |

*Primary Examiner*—Allan N. Shoap
*Assistant Examiner*—Christopher J. McDonald
*Attorney, Agent, or Firm*—David H. Judson

[57] ABSTRACT

Apparatus for holding articles such as drink cups and related personal articles of persons such as members of an athletic team. Individual pockets for holding drink containers are formed along a support panel, and corresponding hooks are supported by the panel in juxtaposed relation to the pockets. Those hooks are intended for supporting personal articles such as gloves or the like in a predetermined location next to the drinking-cup holder chosen for each individual. The entire apparatus is supported on a vertical backstop such as a chain-link fence, by separate hooks provided for that purpose.

9 Claims, 1 Drawing Sheet

HOLDER FOR BEVERAGE CONTAINERS AND RELATED ARTICLES

This is a continuation of co-pending application Serial No. 07/893,726 filed on Jun. 5, 1992, now abandoned.

FIELD OF INVENTION

This invention relates in general to apparatus for holding at least two sets of articles so that an article of each set is held in predetermined relation to a corresponding article of another set, and relates in particular to apparatus for holding individual personal articles such as drinking cups in predetermined relation to another personal article belonging to those individuals.

BACKGROUND OF THE INVENTION

Participants in athletic events are encouraged to maintain fluid levels within their bodies by drinking water or other beverages at frequent intervals throughout the athletic event. In team sports such as baseball or softball, where each team alternately takes the field while most members of the opposing team remain in the dugout or on the bench, the members of each team have an opportunity to drink at regular intervals throughout a game. These beverages may be in the original cans or bottles supplied by the manufacturer, although for safety and sanitation reasons most playing fields do not permit metal or glass containers in areas reserved for players or for spectators. Partly because of these restrictions, reusable drink bottles have become popular with amateur athletic teams as well as spectators. These drink bottles typically include a beverage container made of a suitable plastic material and fitted with a removable screw-top lid for filling the container, which may have sufficient capacity to hold at least a quart of liquid. Extending through the lid is a drink straw, also usually made of plastic and equipped with a removable cap to keep the drink container closed at times when the user is not actually drinking from the straw.

Where each player on an athletic team has his or her own drinking cup, it can become difficult to maintain these cups in some semblance of order as the players of each team repeatedly leave the field and drink from their cups, and then put the cups aside upon returning to the field. The difficulty of keeping a number of players' drinking cups in some kind of orderly arrangement becomes especially acute with young players such as youth baseball or softball teams, where the natural tendency of children to confusion and mix-ups over which drinking cup belongs to what player only compounds the problems coaches or managers have in maintaining order as the teams leave the field and return to the dugout. This level of confusion can become even worse as the team members remove gloves or other articles of athletic gear each time they leave the field, and then sort through a jumbled pile of those articles the next time those team members return to the field. At the level of youth league playing, moreover, the "dugout" for each team typically comprises an assigned location along a chain-link fence at either side of home plate, so that drink cups and athletic gear must be placed on the Found and are subject to being knocked over or stepped on.

SUMMARY OF THE INVENTION

Stated in general terms, the present invention is an apparatus for holding a plurality of a first group of articles such as personal beverage containers, and at the same time holding another group of personal articles in a predetermined relation to the beverage containers so that each player can place a drinking cup and some other personal article in a predetermined relation. This predetermined relation preferably juxtaposes the drinking cup and other personal article for each player. In this way, for example, a softball or baseball player upon leaving the field knows where his or her drinking cup is located, and also has in close proximity a hook or similar device on which that player can temporarily support a glove or other personal article while not occupying the playing field.

Stated in somewhat greater detail, the apparatus of the present invention defines a plurality of separate receptacles each configured to hold a personal drink container. The apparatus also includes a number of article holders each in predetermined juxtaposed relation to a corresponding one of the drink-container receptacles. Both the receptacles for holding drink containers and the devices for holding articles such as gloves or the like are mounted on a support structure such as a flat panel. This support is equipped with hooks or other attachment devices so that the support, and thereby the entire apparatus, can readily be attached to a fence or other vertical surface, thereby maintaining the drink-cup receptacles and article holding devices in close proximity to the team players located adjacent that fence.

The receptacles for holding drink containers preferably are mounted contiguous to one another in a row along the support member, the article-holding devices likewise preferably are mounted in a row along the support member, juxtaposed to the cup holders and in vertical spaced relation to those holders. The players thus can leave the playing field, remove their gloves and hang each glove on an individual hook or other device provided for the purpose, and then immediately reach above or below that hook to remove their personal drinking cups from the apparatus. Once the game or other athletic event is concluded, the apparatus is readily removed from the fence and stored for later usage. Articles according to the present invention preferably are made of foldable sheet material for that purpose.

Accordingly, it is an object of the present invention to provide an improved apparatus for holding drinking cups.

It is another object of the present invention to provide apparatus for holding drinking cups in predetermined juxtaposed relation to other articles.

It is yet another object of the present invention to provide apparatus for holding personal beverage containers and at least one article of athletic equipment in juxtaposition, for each one of plural individuals.

Other objects and advantages of the present invention will become more readily apparent from the following detailed description of a preferred embodiment.

DETAILED DESCRIPTION OF PREFERRED EMBODIMENT

Figure 1:
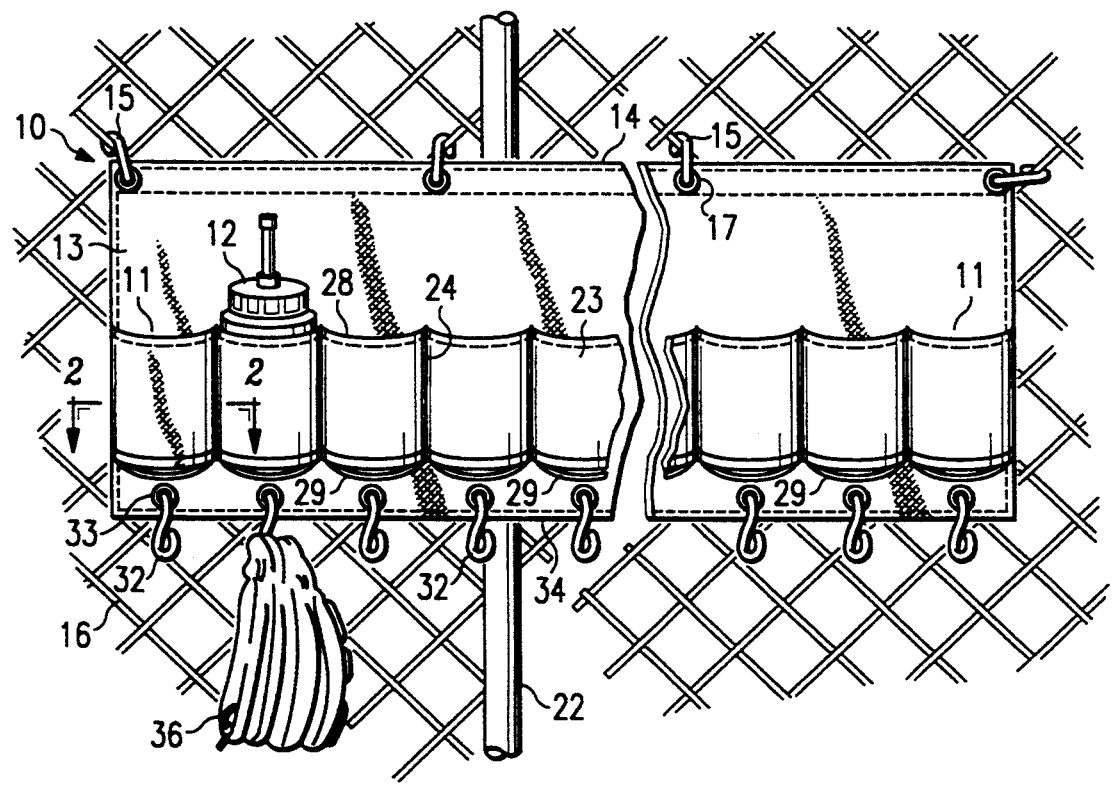
FIG. 1 shows in pictorial view a holder for drink containers and related articles according to a preferred embodiment of the present invention.

Turning to FIG. 1, there is shown generally at 10 a holder having a number of separate pockets 11 configured for holding individual containers such as the conventional drink cups 12 or the like. These pockets 11 are supported on a flat panel 13 having an upper side 14 and several hooks 15 adjacent that upper side for engaging a suitable vertical support structure such as the chain link fence 16 and supporting the holder 10 therefrom. Each hook 15 has a portion extending through a corresponding grommet 17 for reinforcing a hole extending through the material of the panel 13.

The panel 13 preferably is fabricated from a flexible sheet material such as vinyl or the like, so that the panel readily conforms to irregular surfaces such as the fence post 22, as in use it may not be possible to place the holder 10 on an absolutely flat vertical surface. The use of a relatively flexible material for the panel 13 also allows the holder 10 to be rolled or folded to a relatively flat and compact shape when removed from the fence and not in use.

The several pockets 11 are formed in the preferred embodiment by a single strip 23 of flexible material extending along the length of the panel 13. The strip 23 is gathered to bulge outwardly from the front surface of the panel 13, these bulges forming the individual pockets 11. Between each individual pocket 11, the strip 23 is secured to the underlying panel 13 along a line 24 extending across the width of the strip. This securement at the line 24 preferably is accomplished by a technique such as heat sealing or the like to establish a permanent bond between the strip 23 and the underlying panel 13 along the securement line.

A stiffening bead 28 is preferably molded or otherwise formed along the upper edge of the strip 23. This stiffening bead helps provide definition to the individual pockets 11, and assists in defining the open shape of the pocket and helping to keep those pockets open when a drinking cup 12 is removed from the pocket.

Figure 2:
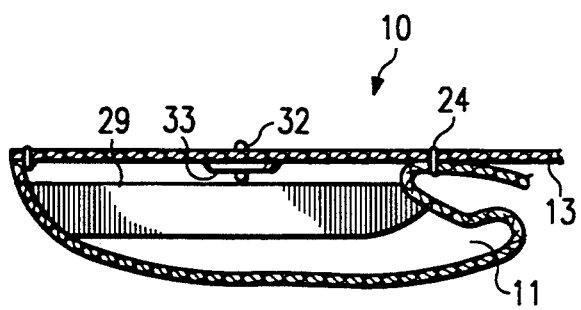
FIG. 2 shows a section view along line 2—2 of FIG. 1.

A separate elastic strap 29 is sewn in the bottom of each pocket 11 for supporting the cups in the pockets, as best shown in FIG. 2. In this regard, it should be recalled that the cups 12 typically contain at least one quart of liquid when filled and the cups may often be placed into the respective pockets 11 with substantial force during the emotional rigors of an athletic contest, and so the material defining the pockets and, indeed, the entire holder 10, should be fabricated to withstand this expected usage. Of course, it should be understood that other means can be used to close the bottoms of the pockets 11.

A hook 32 is attached to the panel 13 below and in vertical alignment with each pocket 11. These hooks 32 are attached to the panel 13 by means of the grommets 33 at openings located near the lower edge 34 of the panel. The size and shape of each hook 32 is chosen to adapt the hooks for supporting the personal articles associated with the athletes or others for whom the particular holder 10 is intended. In the preferred embodiment disclosed herein, wherein the holder 10 was designed for use by softball or baseball players, the hooks 32 are intended to hold personal articles such as the player's glove 36, although it should be understood that caps or other personal articles may also be supported on the individual hooks 32. The hooks 32 are equal in number to the pockets 11, and each hook is located on the panel 13 directly below a corresponding one of the pockets. This physical arrangement of pockets 11 and hooks 32 on the panel 13 provides an article-receiving hook in predetermined juxtaposed relation to a corresponding pocket 11 so that all players on an athletic team have a particular pocket for holding their drink cups between use and a corresponding juxtaposed article-receiving hook for holding their gloves or other personal articles.

A particular embodiment of the present invention has fifteen pockets 11, each pocket being approximately three inches in diameter and approximately seven inches high to receive and support drink cups of sizes currently in use. The overall holder is approximately five feet long and seventeen and one-half inches high. Of course, it will be understood that the foregoing sizes and dimensions are but one specific example embodying the present invention.

The operation of the preferred embodiment should now be apparent. Assuming the holder 10 is used by a softball team, that holder is hung or otherwise attached to a suitable vertical surface such as the fence 16, by means of the attachment hooks 15 located along the upper side 14 of the panel 13. Although the attachment hooks 15 must support the weight of the holder 10 when loaded with a full complement of filled drink cups in the pockets 11 and gloves 36 suspended from the article-receiving hooks 32, the attachment hooks 15 typically are fewer in number than the number of pockets 11 and the corresponding article-receiving hooks.

With the holder 10 attached to an upright surface such as a fence 16 or the like, each member of the athletic team now can place his or her individual drink cup in one of the pockets 11. Each individual can be assigned a particular pocket 11 and corresponding article-receiving hooks 32, with the name or initials of that person written at an appropriate location on or near the individual cup and juxtaposed article-receiving hook. Alternatively, each individual can place his or her drink cup in any available pocket 11 on a first-come basis, with the juxtaposed article-receiving hook 32 then used for supporting a glove or other personal article belonging to that player. When the team members return to the field, they return their drink cups to the appropriate pockets 11 and retrieve their gloves or other personal articles from the respective hooks 32 juxtaposed to those pockets.

It will now be understood that the present holder accomplishes an orderly supporting of the drinking cups and other personal articles for a group of individuals such as members of an athletic team. The pockets 11 not only keep the drinking cups supported and separated in an orderly manner, but also support those cups in elevated relation off the Found, thereby reducing the likelihood that at least some cups will be overturned, stepped on or tripped over by team members, or otherwise soiled or damaged. The article-receiving hooks 32 also help keep the players' gloves or other personal articles off the Found when not in use, and thus help each player keep up with his or her personal equipment It should be understood that the foregoing relates only to a preferred embodiment of the present invention, and that numerous changes and modifications therein may be made without departing from the spirit and scope of the invention as defined in the following claims.

We claim:

1. Apparatus for holding a plurality of personal beverage containers and a corresponding plurality of other personal articles in predetermined juxtaposition with the beverage containers, comprising:

a substantially flat support panel having a longitudinal dimension, the support panel being of a flexible sheet material that conforms to an irregular structure against which the support panel is placed in use and that allows stowing the apparatus in a relatively compact shape when not in use;

a plural number of receptacles on a surface of the support panel, each receptacle being configured to hold a single beverage container and being contiguous to another such receptacle along the longitudinal dimension of the support panel;

each receptacle having an open top to receive the beverage container and an interior member to support the beverage container so that a top portion of the beverage container extends above the open top of the receptacle, the bottoms of the receptacles otherwise being open so that spilled beverages can drain through the open bottoms of the receptacles;

a corresponding number of hooks carried by the support panel beneath the bottoms of the receptacles, each hook being located in predetermined juxtaposition adjacent a corresponding receptacle so that each hook can support another personal article in said predetermined juxtaposition to the corresponding receptacle; and means disposed adjacent an upper portion of the flat panel for removably supporting the apparatus in use in an upright attitude along the structure.

2. Apparatus as in claim 1, wherein:

the interior member of each receptacle comprises a strap extending across the receptacle for supporting the bottom of a beverage container in the receptacle without closing the bottom of the receptacle.

3. Apparatus as in claim 1, wherein:

each receptacle comprises a loop of material extending outwardly from the surface of the support panel to define the open top of the receptacle.

4. Apparatus as in claim 1, wherein:

each receptacle comprises a loop of material extending outwardly from the surface of the support to define the open top of the receptacle; and each hook is mounted on the support panel beneath the loop for receiving an article.

5. Apparatus as in claim 4, wherein:

the loops extend along a first path on the longitudinal dimension of the support path; and the hooks extend along a second path on the longitudinal dimension of the support panel beneath the first path so as to support the personal articles hanging downwardly from the hooks without interfering with beverage containers supported in the loops.

6. Article as in claim 5, wherein:

the loops comprise a length of flexible material extending along the longitudinal dimension with portions extending outwardly from the surface of the support member at periodic intervals to form individual holders for beverage containers and secured to the surface between those intervals so as to maintain the loops.

7. Apparatus as in claim 4, further comprising:

a grommet extending through the support panel beneath each receptacle and engaging the hook corresponding to the receptacle, so as to reinforce the support panel for carrying the weight of an article engaged by the hook.

8. Apparatus as in claim 6, further comprising:

a stiffening bead formed at an upper edge of the length of flexible material to assist in maintaining the open shape of the receptacle when a beverage container is removed from the receptacle.

9. Apparatus for holding a plurality of personal beverage containers and a corresponding plurality of other personal articles in predetermined juxtaposition with the beverage containers, comprising:

a substantially flat support panel having a longitudinal dimension, the support panel being of a flexible sheet material that conforms to an irregular structure against which the support panel is placed in use and that allows stowing the apparatus in a relatively compact shape when not in use;

a plurality of receptacles on a surface of the support panel, each receptacle comprising a loop of flexible material extending outwardly from the surface of the support panel and being configured to hold a single beverage container when the support panel is placed in use, the loop being configured to collapse along the longitudinal dimension of the support panel to facilitate said stowing of the apparatus;

each receptacle being contiguous to another such receptacle along the longitudinal dimension of the support panel and having an open top to receive the beverage container and an interior member to support the beverage container so that a top portion of the beverage container extends above the open top of the receptacle, the bottoms of the receptacles otherwise being open so that spilled beverages can drain through the open bottoms of the receptacles; and a corresponding number of hooks carried by the support panel beneath the bottoms of the receptacles, each hook being located in predetermined juxtaposition adjacent a corresponding receptacle so that each hook can support another personal article in said predetermined juxtaposition to the corresponding receptacle.

* * * * *